(12) United States Patent
Croisettier et al.

US007158996B2

(10) Patent No.: US 7,158,996 B2
(45) Date of Patent: Jan. 2, 2007

(54) METHOD, SYSTEM, AND PROGRAM FOR MANAGING DATABASE OPERATIONS WITH RESPECT TO A DATABASE TABLE

(75) Inventors: RamanaKumari M. Croisettier, Morgan Hill, CA (US); Paramesh S. Desai, San Jose, CA (US); Julie Ann Watts, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/440,333

(22) Filed: May 16, 2003

(65) Prior Publication Data

US 2004/0148293 A1 Jul. 29, 2004

Related U.S. Application Data

(63) Continuation-in-part of application No. 10/353,138, filed on Jan. 27, 2003.

(51) Int. Cl.
*G06F 7/00* (2006.01)
*G06F 17/00* (2006.01)
*G06F 17/30* (2006.01)

(52) U.S. Cl. ............................. 707/103; 707/2; 707/3

(58) Field of Classification Search ................ 707/102, 707/3, 100, 5, 1, 103, 2; 235/375; 714/1; 710/1
See application file for complete search history.

(56) References Cited

U.S. PATENT DOCUMENTS

| 5,551,027 A | 8/1996 | Choy et al. |
| 5,799,311 A | 8/1998 | Agrawal et al. |
| 5,870,735 A | 2/1999 | Agrawal et al. |
| 5,881,379 A | 3/1999 | Beier et al. |
| 5,933,820 A | 8/1999 | Beier et al. |
| 6,014,656 A | 1/2000 | Hallmark et al. |
| 6,055,539 A | 4/2000 | Singh et al. |
| 6,122,628 A | 9/2000 | Castelli et al. |
| 6,272,498 B1 | 8/2001 | Muthukrishnan et al. |
| 6,374,232 B1 | 4/2002 | Dageville et al. |
| 6,920,460 B1 * | 7/2005 | Srinivasan et al. ......... 707/102 |

(Continued)

OTHER PUBLICATIONS

Chaudhuri et al., "Including Group-By in Query Optimization", Proceedings of the 20th VLDB Conference; Santiago, Chile, 1994.*

(Continued)

*Primary Examiner*—Jeffrey Gaffin
*Assistant Examiner*—Michael J. Hicks
(74) *Attorney, Agent, or Firm*—David W. Victor; Konrad Raynes & Victor LLP (57) ABSTRACT

Provided are a method, system, and program for managing a database. A request is processed to create an index on at least one key column of a table in a computer readable medium. A determination is made of table partitions in which rows of the table are stored. One index partition is generated for each determined table partition, wherein each index partition includes nodes, wherein each node in each index partition includes a key value from at least one column in a corresponding table row in the table partition associated with the index partition and a location identifier identifying the corresponding table row in the corresponding table partition. In certain embodiments, a technique is implemented during queries to limit the search to a subset of the multiple index partitions when possible and return rows in the order of the key columns of the index while the same range of key values can exist across multiple index partitions.

31 Claims, 8 Drawing Sheets

U.S. PATENT DOCUMENTS

2002/0032676 A1 3/2002 Reiner et al.
2004/0199530 A1* 10/2004 Avadhanam et al. ........ 707/100
2005/0038784 A1* 2/2005 Zait et al. ...................... 707/5
2005/0182762 A1* 8/2005 Srinivasan et al. ............. 707/3

OTHER PUBLICATIONS

Banerjee, Jayanta, "Data Structuring and Indexing for Data Base Machines," pp. 11-16, Sperry Univac, St. Paul, MN.

IBM Corp. IBM® DB2® Universal Database. *SQL Reference,* Version 7, pp. 58-62, 712-773 [online]. Available from www.ibm.com.

U.S. Appl. No. 10/353,138, filed on Jan. 27, 2003, entitled "Method, System and Program for Optimizing Database Query Execution," by T.D. Allen, et al.

Murua, A. "On Order Conditions for Partitioned Symplectic Methods." SIAM Journal on Numerical Analysis, Dec. 1997, vol. 34, No. 6, pp. 2204-2211.

* cited by examiner

METHOD, SYSTEM, AND PROGRAM FOR MANAGING DATABASE OPERATIONS WITH RESPECT TO A DATABASE TABLE

RELATED APPLICATIONS

This application is a continuation-in-part of the U.S. patent application entitled "Method, System, and Program for Optimizing Database Query Execution", having U.S. application Ser. No. 10/353,138, filed on Jan. 27, 2003, which patent application is incorporated herein by reference in its entirety.

BACKGROUND OF THE INVENTION

1. Field of the Invention

The present invention relates to a method, system, and program for managing database operations with respect to a database table.

2. Description of the Related Art

Data records in a relational database management system (RDBMS) in a computer are maintained in tables, which are a collection of rows all having the same columns. Each column maintains information on a particular type of data for the data records which comprise the rows. One or more indexes may be associated with each table. An index is an ordered set of pointers to data records in the table based on the data in one or more columns of the table. In some cases, all the information needed by a query may be found in the index, making it unnecessary to search the actual table. An index is comprised of nodes which include an index key and a pointer to a database record in the table having the key column values of the index entry key. Index keys are stored in a sorted order in the index and the pointers associated with the key values provide a mechanisms for fast access of associated rows in the table in the sorted order of the index. Columns that are used frequently to access a table may be used as key columns. Using an index to search and access rows in the associated table substantially improves query performance.

Database tables and indexes are stored in a table and index spaces, respectively. The table and index spaces may be organized in multiple partitions. A single table space can have one or more tables. If the table space is partitioned, then there is only one table that can be implemented in the multiple partitions. When a database table is created, a partition map may be created for the table that is used to determine in which partition a row in the table is stored when the table is stored in multiple partitions. The user may specify in the partition map one or more partition map columns and specify a mapping of the partition map column values to partitions by specifying ranges of values. A partition map column is a column of the table row whose value determines in which partition the row is stored. The definition of the partition map would indicate criteria for determining which partition to store in a row based on the one or more column values in the table row that correspond to partition map columns.

A key value comprises a concatenation of the index key column values from one record in the table. For instance, the partition map may map different ranges of partition column values to different partitions, such that a new row being added to the table whose column value falls within one specified range of values is stored in the partition associated with that range.

In current art, an index on a database table that is not the partition map comprises a non-partitioned secondary index (NPSI). The NPSI comprises one index that provides an ordering of all rows in the database table according to one or more key columns of the table. When performing queries on the index, the entire index is scanned to determine key column values that satisfy the query search predicates, which then produces the table rows identified by the index nodes whose key column values satisfy the search predicates.

SUMMARY OF THE DESCRIBED IMPLEMENTATIONS

Provided are a method, system, and program for managing a database. A request is processed to create an index on at least one key column of a table in a computer readable medium. A determination is made of table partitions in which rows of the table are stored. One index partition is generated for each determined table partition, wherein each index partition includes nodes, wherein each node in each index partition includes a key value from at least one column in a corresponding table row in the table partition associated with the index partition and a location identifier identifying the corresponding table row in the corresponding table partition.

In further implementations, a request is received to add a row to the table. A determination is made of one of a plurality of table partitions on which to store the added row and one index partition associated with the determined table partition. A node is added to the determined index partition including a key value from the row added to the table and the location identifier for the added row.

In still further implementations, a query specifying search predicates on at least one column of the table is processed. If the query specifies search predicates on at least one key column of the index partitions, then at least one index partition for index nodes having key values that satisfy the search predicates is queried and rows are returned from the table corresponding to the located index nodes whose key values satisfy the search predicates.

Further provided are a method, system, and program for managing a database. A query is processed on an index to access rows from a table that satisfy search predicates on at least one index key column corresponding to one column in the table. A determination is made of at least one table partition capable of including table rows that satisfy the search predicates and of one index partition corresponding to each determined table partition. Each index partition provides an index on a subset of table rows from one corresponding table partition, wherein each node in the index partition includes a key value and location identifier for a corresponding table row in the corresponding table partition. Each determined index partition is queried for index nodes whose key values satisfy the search predicates and data is returned from the table rows addressed by the location identifiers in the index nodes whose key values satisfy the search predicates.

Described implementations provide techniques for maintaining index nodes fora a table in separate index partitions in order to improve database performance when performing database operations with respect to the table.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1A:
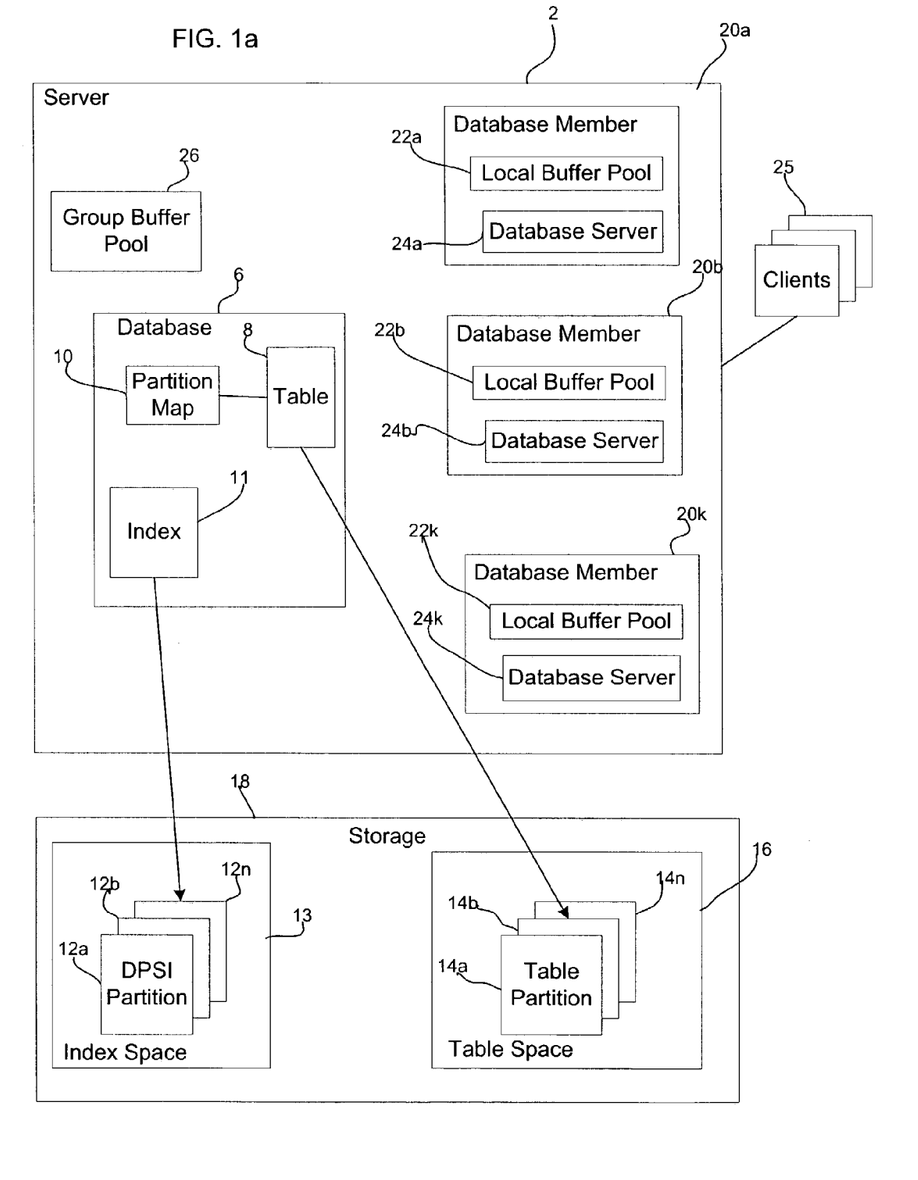
FIG. 1a illustrates a computing environment in which aspects of the invention are implemented in accordance with implementations of the invention.

FIG. 1a illustrates a computing environment in which a database may be implemented. A server 2, which may comprise any server class system known in the art, receives and handles database requests, such as database queries, directed to tables or indexes in a database 6. Database 6 is shown as having a table 8, a partition map 10, and an index 11. The partition map 10 identifies one or more columns of the table 8 as partition map columns, and uses the partition map column values to associate table rows with one partition 14a, 14b . . . 14n in a table space 16 in storage 18 where the table 8 data is stored. The partition map 10 criteria may indicate ranges of values associated with different partitions 14a, 14b . . . 14n defined for the table 8, such that when adding a row to the table 8, the column value for the added row corresponding to the partition map column determines in which partition 14a, 14b . . . 14n the row will be stored. For instance, the partition map 10 may indicate a range of partition map column values for each partition 14a, 14b . . . 14n, such that the row is stored in the partition associated with the range including the column value of the row.

The index 11 on the table 8 may be implemented as a plurality of data partitioned secondary indexe (DPSI) partitions 12a, 12b . . . 12n in an index space 13, where each DPSI partition 12a, 12b . . . 12n provides a scannable index on a subset of rows of the table 8. This makes the index 11 partitioned. In certain implementations, each DPSI partition 12a, 12b . . . 12n is associated with one table space partition 14a, 14b . . . 14n, such that each DPSI partition 12a, 12b . . . 12n has nodes arranged in a tree structure, such as a B-tree, where each node has a key value for one table record and a location identifier, such as record identifier (RIDs), pointing to the corresponding table row in the table space partition 14a, 14b . . . 14m. In this way, the rows in the table 8 in one table space partition 14a, 14b . . . 14n may be separately searched by searching the DPSI partitions 12a, 12b . . . 12n that includes the key value for each row in the table space partition 14a, 14b . . . 14n associated with that DPSI partition 12a, 12b . . . 12n.

Figure 1B:
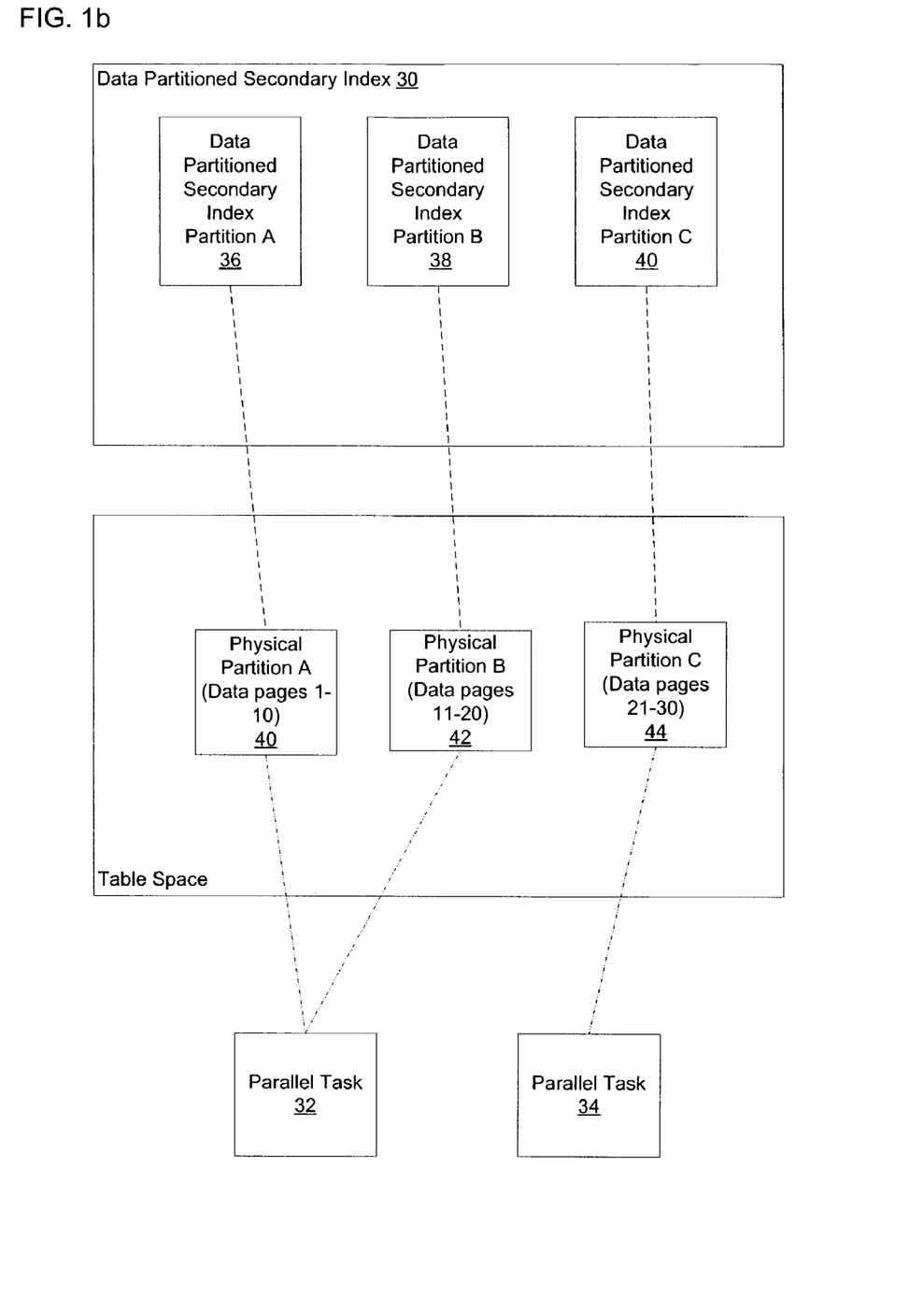
FIG. 1b illustrates an example of a data partitioned secondary index in accordance with implementations of the invention.

FIG. 1b provides a further example of a data partitioned secondary index (DPSI) and, in particular, a mapping of a data partitioned secondary index 30 to physical partitions on storage device 18 against which parallel tasks 32, 34 execute in accordance with certain implementations of the invention. In particular, the data partitioned secondary index (DPSI) 30 is partitioned into three partitions: data partitioned secondary index (DPSI) partition A 36, data partitioned secondary index (DPSI) partition B 38, and data partitioned secondary index (DPSI) partition C 40. Storage device 18 stores physical partition A 40 with data pages 1–0, physical partition B 142 with data pages 11–20, and physical partition C 144 with data pages 21–30. Each data partitioned secondary index (DPSI) partition is associated with a physical partition. For example, data partitioned secondary index (DPSI) partition A 36 is associated with physical partition A 40. Data partitioned secondary index (DPSI) partition B 38 is associated with physical partition B 42. Data partitioned secondary index (DPSI) partition C 40 is associated with physical partition C 44. Additionally, parallel task 32 is assigned data pages 1–10 of physical partition A 40 and data pages 11–20 of physical partition B 42. Parallel task 34 is assigned data pages 21–30 of physical partition C 46.

By assigning data pages to parallel tasks, certain implementations of the invention, further discussed in detail in U.S. patent application Ser. No. 10/353,138, which was incorporated by reference in its entirety above, are able to map the data pages to physical partitions, which are then mapped to associations with data partitioned secondary index partitions. Since different parallel tasks access different data pages and different data partitioned secondary index partitions, I/O contention between parallel tasks is minimized and overall elapsed time is reduced. Thus, implementations of the invention achieve an elapsed time improvement over sequential database query execution by creating multiple parallel tasks to concurrently access data through a data partitioned secondary index and by using data page range partitioning (i.e., assigning different data page ranges to different parallel tasks having the same key range).

The storage 18 may comprise any type of non-volatile storage device known in the art. Further, pages of any of the table space partitions 12a, 12b . . . 12n and 14a, 14b . . . 14m, or part thereof, may be loaded into the memory of the server 2 or the database members 20a, 20b . . . 20n.

Although only one table 8, partition map 10, index 11 and one set of DPSI partitions 12a, 12b . . . 12n and table space partitions 14a, 14b . . . 14n are shown, the database 6 may include many tables and DPSIs, as well as additional sets of index and table space partitions for the tables and indexes in the database 6. Moreover, multiple DPSIs defined on one table may each be comprised of multiple partitions, where each DPSI has a different set of key columns on the table.

Database members 20a, 20b . . . 20k include a local buffer pool 22k, 22b . . . 22k to store records retrieved from the database 6 and a database server 24a, 24b . . . 24k, such as a database management server (DBMS), to receive requests from database clients 25 and execute such requests against the database 6. The database clients initiating the requests may execute within the server 2 or on a system external to the server 2. The database server 24a, 24b . . . 24k may then perform operations on database 6 data retrieved through the database server 24a, 24b . . . 24k written to the local buffer pool 22k, 22b . . . 22k. When modifying data in a local buffer pool 22k, 22b . . . 22k, the database servers 24a, 24b . . . 24k would write any modifications to a group buffer pool 26. Any database server 24a, 24b . . . 24k accessing database data in their local buffer pool 22k, 22b . . . 22k would first check the group buffer pool 26 to determine if there is a more recent version of the data they are accessing, and if so, access such more recent version of the data from the group buffer pool 26.

The database member 20a, 20b . . . 20n may be implemented in computer systems separate from the server 2.

Alternatively, the database members 20a, 20b . . . 20n may comprise programs or processes that execute within the server 2.

Figure 2:
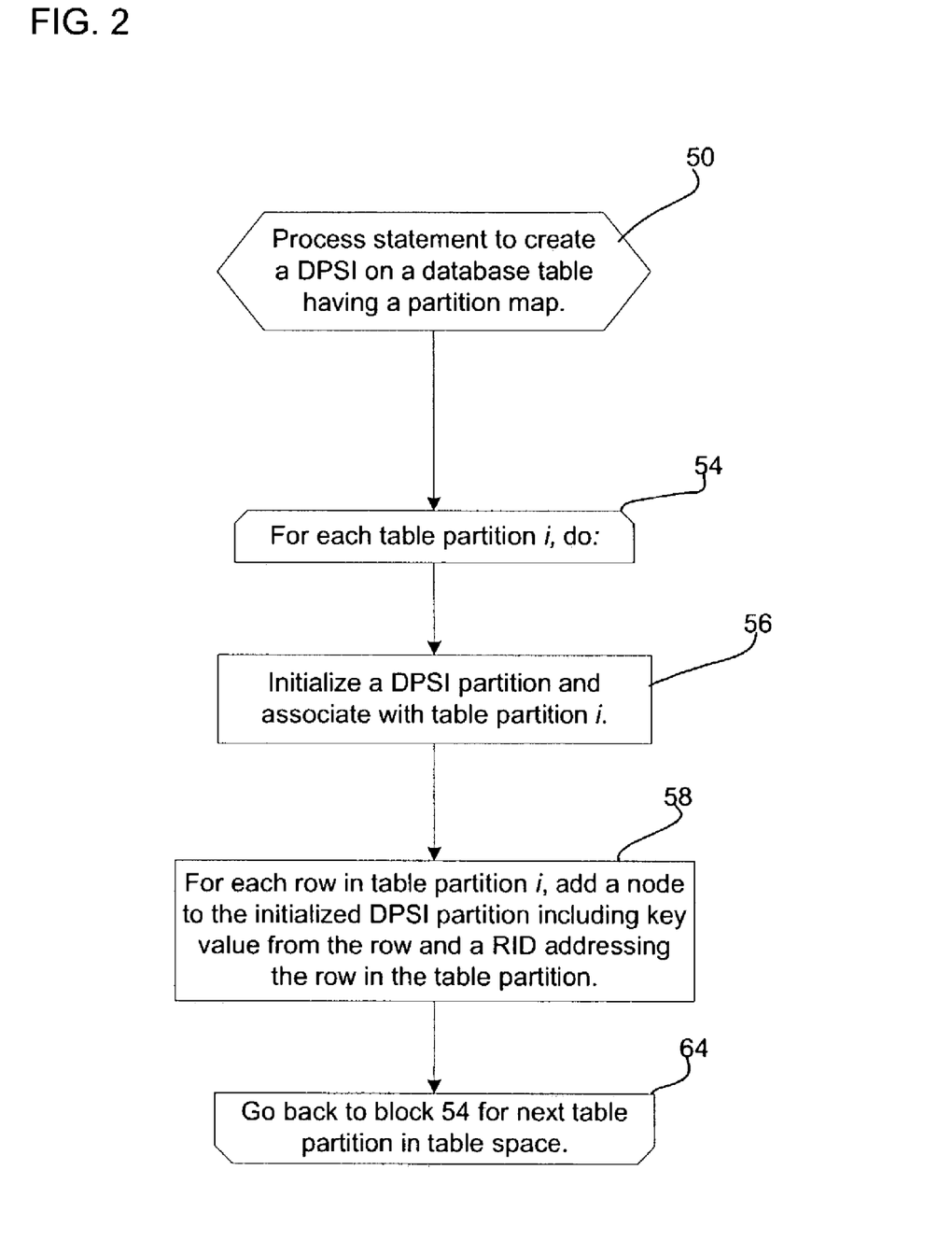
FIG. 2 illustrates operations performed to create an index in accordance with implementations of the invention.

FIG. 2 illustrates operations performed by the database servers 24a, 24b . . . 24k to create an index and a data partitioned secondary index (DPSI) on a table 8 having a partition map. Upon receiving (at block 50) a statement, such as a structured query language (SQL), to create a DPSI index 11 on one or more key columns of a table 8, the database server 24a, 24b . . . 24k then performs a loop blocks 54 through 64 for each table space partition i. For each partition i, the database server 24a, 24b . . . 24k initializes (at block 56) a DPSI partition 12a, 12b . . . 12n having one or more columns corresponding to one or more columns in the table 8. Thus, each initialized DPSI partition 12a, 12b . . . 12n corresponds to one of the table space partitions 14a, 14b . . . 14n, such that the DPSI partitions will provide the index 11 key values for rows in the table space partition 14a, 14b . . . 14n in an index data structure, such as a searchable tree or B-tree type index data structure. For each row in table space partition i, the database server 24a, 24b . . . 24k adds (at block 58) a node to the DPSI partition 12a, 12b . . . 12n corresponding to table space partition i, including the key value (one or more key column values) from the row and a record identifier (RID), or other location identifier, addressing the added row in the table space partition i. Thus, each DPSI partition 12a, 12b . . . 12n includes one node for each row in the corresponding table space partition 14a, 14b . . . 14n. After a DPSI partition is initialized, the operation at step 58 may be deferred, such that the nodes including data from the table partition may be added at a later time. Further, the creation of the DPSI partition itself may also be deferred.

Figure 3:
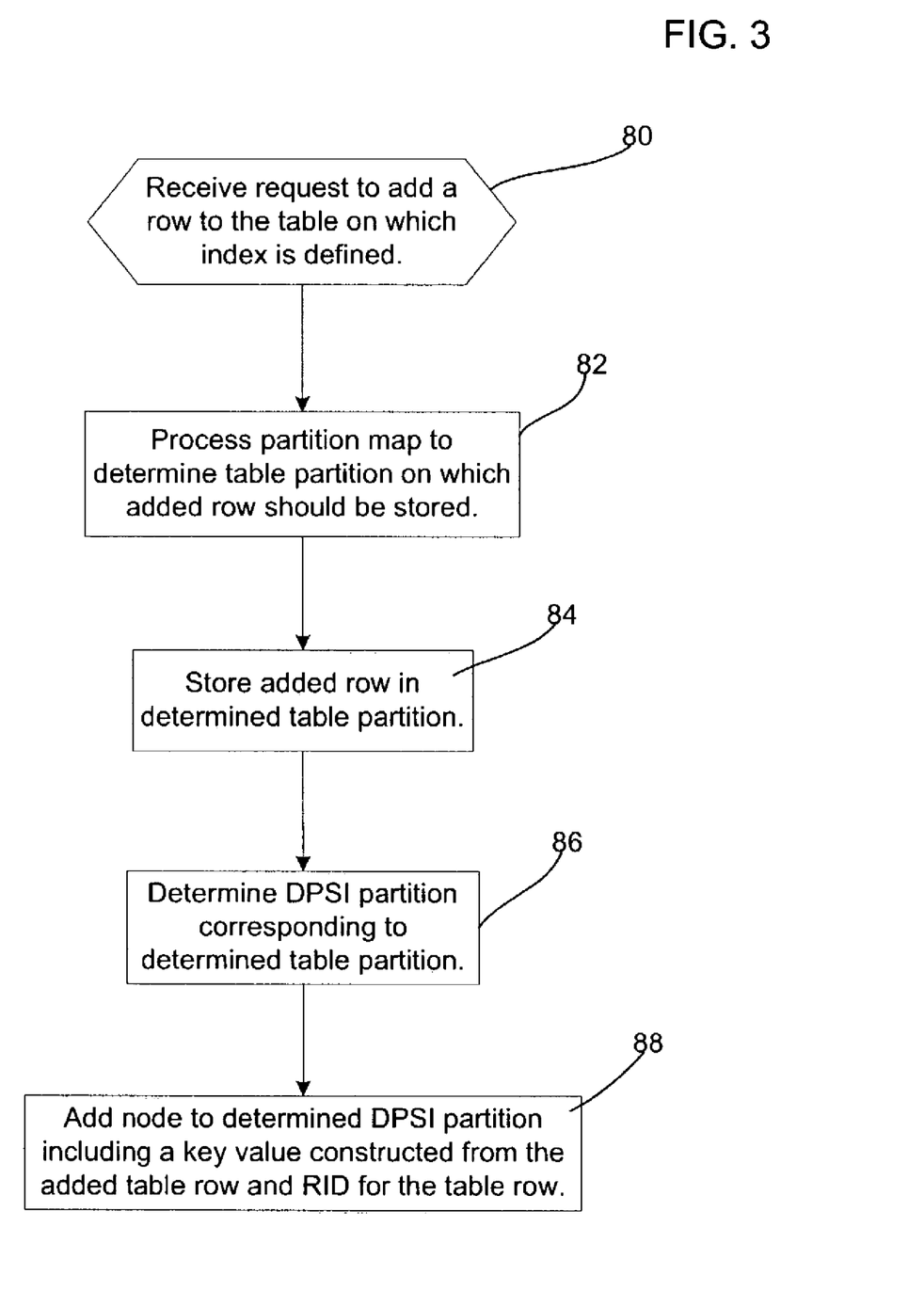
FIG. 3 illustrates operations performed to add a row to a table in accordance with implementations of the invention.

FIG. 3 illustrates operations performed by the database server 24a, 24b . . . 24k to add a row to the table 8. Upon receiving (at block 80) a request to add a row to the table 8 on which a DPSI is defined, the database server 24a, 24b . . . 24k processes (at block 82) the partition map 10 to determine the partition 14a, 14b . . . 14n on which the added row should be stored. As discussed, the partition map 10 may associate different partition map column values, or ranges of values, to specific table space partitions 14a, 14b . . . 14n. In such implementations, the partition map 10 maps table rows to a corresponding table space partition 14a, 14b . . . 14n based on the partition map column value for that added row. The added row is then stored (at block 84) in the determined table space partition 14a, 14b . . . 14n. The database server 24a, 24b . . . 24k then determines (at block 86) the DPSI partition 12a, 12b . . . 12n corresponding to the determined table space partition. A node is then added (at block 88) to the determined DPSI partition 2a, 12b . . . 12n including a key value constructed from the added table row and the location identifier, e.g., RID, of the added table row. In this way, only the particular DPSI partition 12a, 12b . . . 12n corresponding to the table space partition 14a, 14b . . . 14n in which the row is added is updated with a new node for the added table 8 row.

Figure 4:
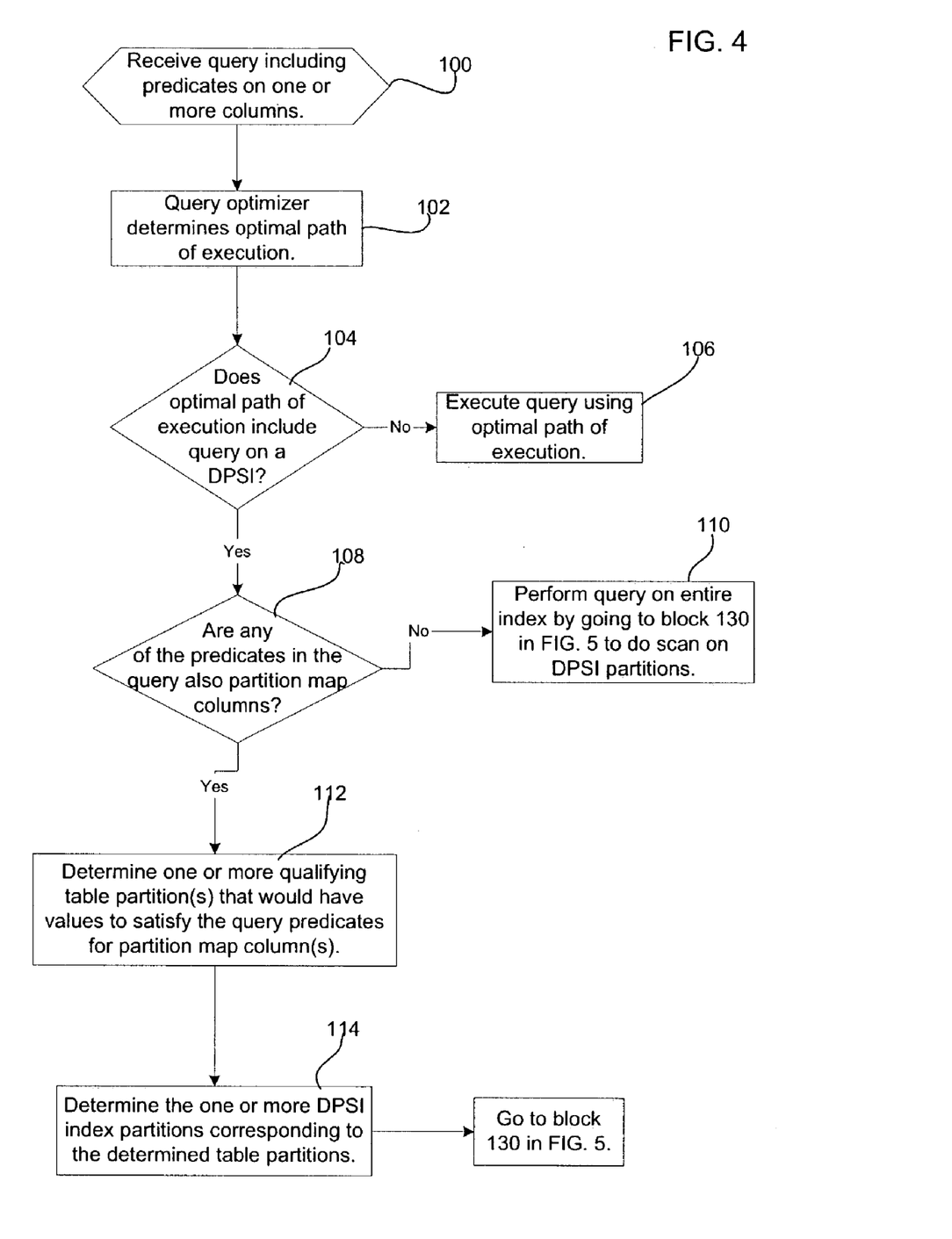
FIGS. 4, 5, and 6 illustrate operations performed to query a table in accordance with implementations of the invention.
Figure 5:
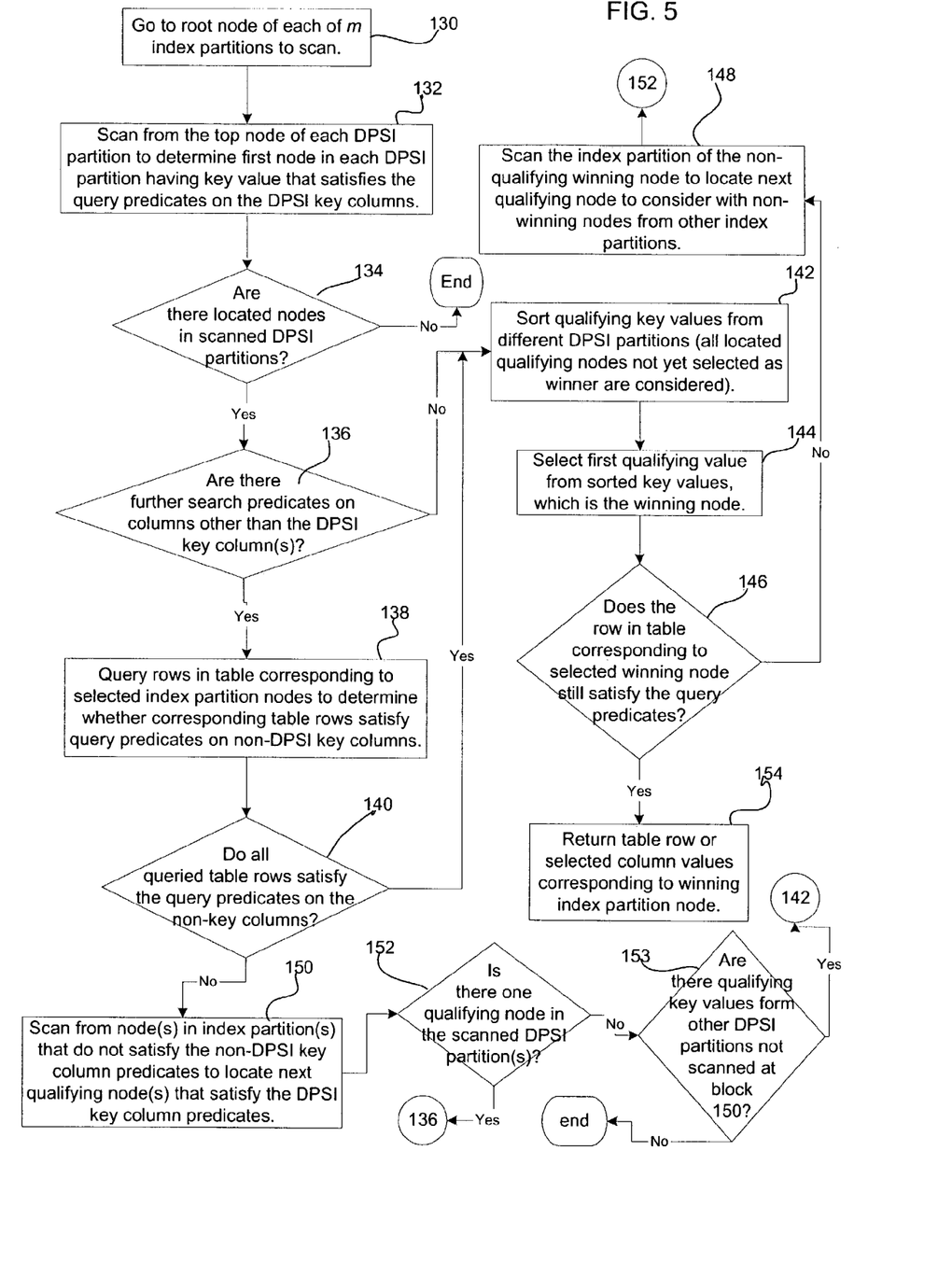
Figure 6:
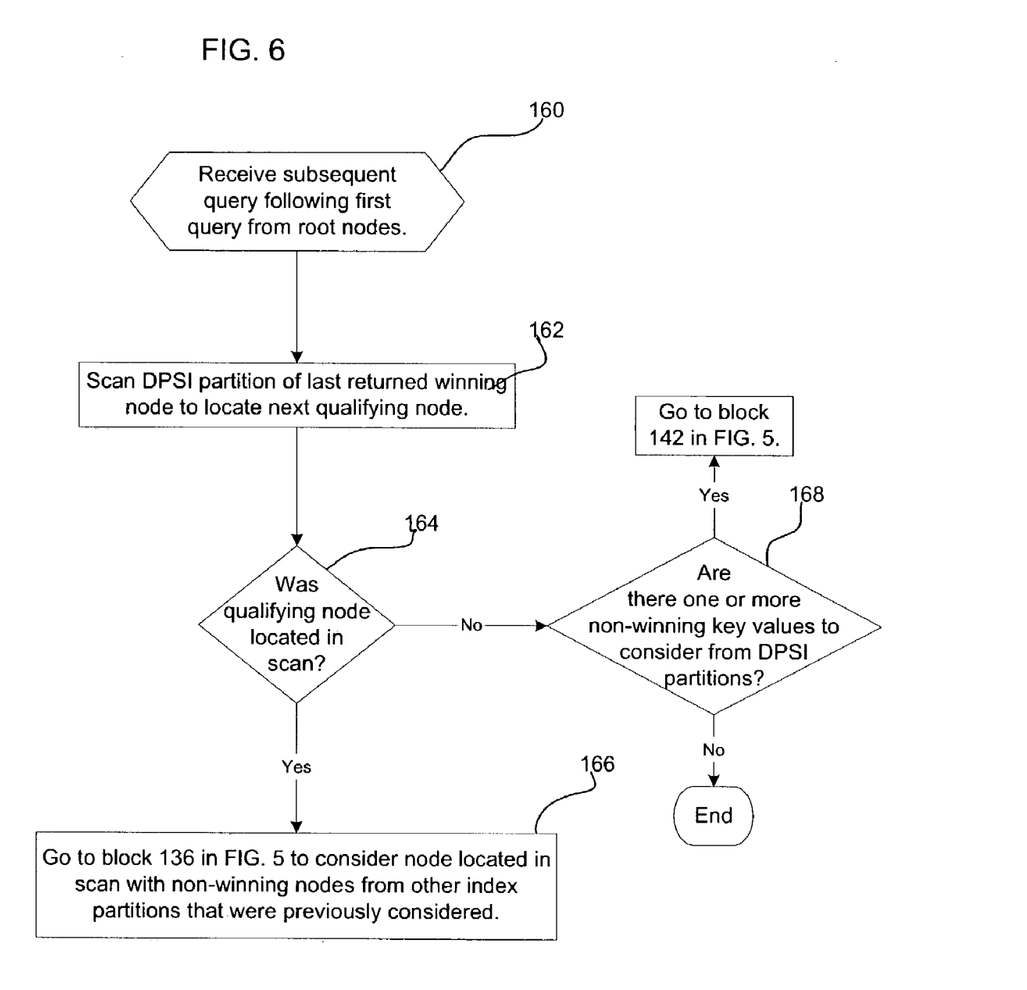
Figure 7:
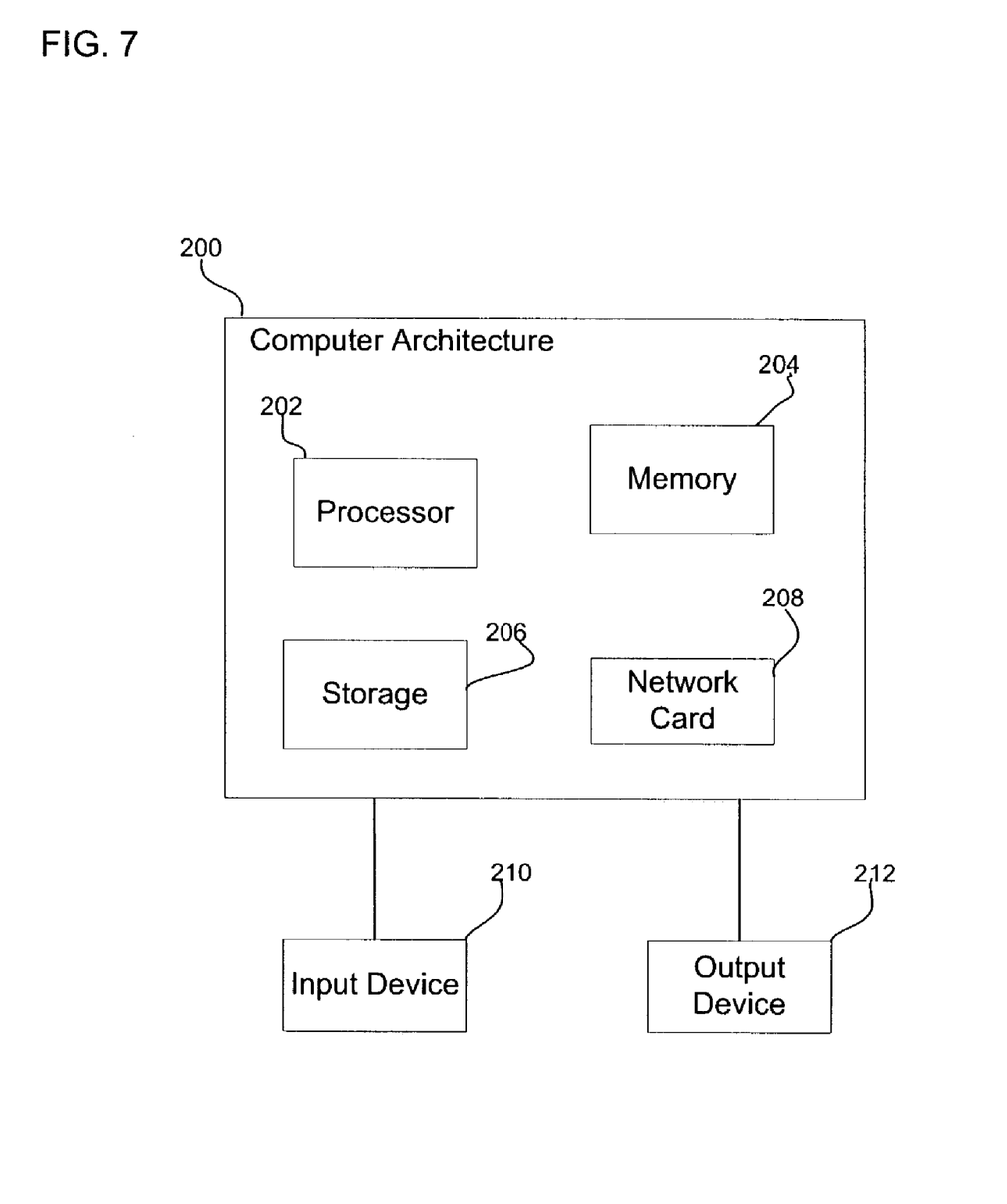
FIG. 7 illustrates a computing architecture that may be used with the described implementations.

FIGS. 4, 5, and 6 illustrate operations performed by the database server 24a, 24b . . . 24k to process a query on the table 8 transmitted from one of the database members 20a, 20b . . . 20n. The database server 24a, 24b . . . 24k would include a query engine (not shown) to execute database queries against tables in the database 6. With respect to FIG. 4, upon receiving (at block 100) a query including search predicates on one or more columns in the table 8, a query optimizer in the database server 24a, 24b . . . 24k determines (at block 102) an optimal path of execution for the query. If (at block 104) the optimal path does not use a DPSI, then the database server 24a, 24b . . . 24k executes (at block 106) the query against the table and/or any non-DPSI indexes in a manner known in the art. Otherwise, if (at block 104) the optimal execution path does include a DPSI, then a determination is made (at block 108) of whether any of the predicates in the query also include partition map columns. If not, then the search cannot be limited to a particular partition, and the database server 24a, 24b . . . 24k proceeds (at block 110) to block 130 in FIG. 5 to perform a query on all the DPSI partitions 12a, 12b . . . 12n for index nodes whose key column value(s) satisfy the query search predicates.

If (at block 108) the query includes search predicates on partition map columns, then a determination is made (at block 112) of the one or more qualifying table space partitions associated with column values in the partition map 10 that are capable of satisfying the query search predicates. A determination is then made (at block 114) of the DPSI partitions 12a, 12b . . . 12n corresponding to the determined table space partitions 14a, 14b . . . 14n having index nodes whose key values are capable of satisfying one or more of the query search predicates. Control then proceeds to block to block 130 in FIG. 5 to scan the determined DPSI partitions that are capable of having qualifying key values.

To perform the first scan (from blocks 110 or 114), then the database server 24a, 24b . . . 24k accesses (at block 130) the root, or the top, of each of the m DPSI partitions 12a, 12b . . . 12n to scan, where m may be n or less than n. The database server 24a, 24b . . . 24k then scans (at block 132) from the top node or root in each of the m DPSI partitions 12a, 12b . . . 12n to determine the first node in each DPSI partition whose key value satisfies the query predicates. If (at block 134) no qualifying nodes are located in the any of the scanned DPSI partitions 12a, 12b . . . 12n, then control ends. Otherwise, if the one or more nodes are located, then a determination is made (at block 136) whether there are further search predicates on columns other than the DPSI key columns. If so, then the database server 24a, 24b . . . 24k processes (at block 136) table rows corresponding to the qualifying DPSI nodes (which would be the table rows whose RID (location identifier) is included in the located qualifying nodes from the scanned DPSI partitions) to determine if the table rows satisfy the query predicates on non-DPSI key columns.

If (at block 140) all queried table rows satisfy the query predicates on the non-key columns, then the qualifying key values located in each scanned DPSI partition are sorted (at block 142) if there are multiple nodes according to the sort order of the index. If the index is sorted in an ascending order, then the key values would be sorted from lowest to highest, if a descending order, then the key values would be sorted from highest to lowest. In certain implementations, each DPSI may comprise a B-tree or other searchable tree data structure having a root or top node and descendant nodes organizing one or more key columns according to a sort criteria. The first qualifying key value is selected (at block 144) from the sorted one or more located key values. The index node of the selected qualifying key values is now the winning node. The database server 24a, 24b . . . 24k then reevaluates (at block 146) whether the key value of the winning node still satisfies the query predicate search conditions (on both DPSI key columns and non-DPSI key columns), in the event the row has been updated while doing the search. This reevaluation ensures only qualifying rows are returned. If (at block 146) the row corresponding to the winning index node still satisfies the query predicates, then that row or selected columns from that row are returned (at block 154). Otherwise, if the winning node does not still qualify, due to an intermediate update, then the database server 24a, 24b . . . 24k scans (at block 148) from the winning node to determine the next key value in that DPSI partition of the winning node that satisfies the query predicates on the DPSI key columns. Control then proceeds to block 152.

If (at block 140) the queried table rows do not satisfy the query predicates on the non-DPSI key columns, the database server 24a, 24b . . . 24k scans (at block 150) from node(s) in DPSI partition(s) of the node(s) that do not satisfy the non-DPSI key column predicates to locate next qualifying node(s) that satisfy the DPSI key column predicates. If (at block 152) there is one qualifying node located in the DPSI partitions scanned at block 150 that satisfies the key column predicates, then control proceeds to block 136. Otherwise, if (at block 152) there are no nodes that satisfy the DPSI key column predicates determined in the scan at block 150, then control proceeds to block 153 to determine whether there are qualifying key values form other DPSI partitions not scanned at block 150. If so, control proceeds to block 142, otherwise, control ends.

With respect to FIG. 6, upon receiving (at block 160) a subsequent query on the index following the first query at block 130, the database server 24a, 24b . . . 24k scans (at block 162) the DPSI partition of the last returned winning node to locate the next qualifying node. If (at block 164) a node was located in the scan at block 162, then control proceeds to block 136 in FIG. 5 to consider the node located in the scan at block 162 of the DPSI partition including the previously selected winning node with non-winning nodes from other index partitions that were previously considered, but not selected as winning nodes. If (at block 164) a qualifying node was not located in the scan at block 162 and if (at block 168) there are one or more non-winning key values to consider from DPSI partitions previously scanned, then control proceeds to block 142 in FIG. 5. Otherwise, control ends if there are no further DPSI partitions to consider.

The described logic of FIGS. 4, 5, and 6 implements a query by allowing for a query of DPSI partitions on a table so as to determine table rows having qualifying key column values in the multiple index partitions according to the ordering of the key columns in the index. In alternative implementations, the selection of the key values form the qualifier group may be based on some other criteria to allow for sorting in a descending order. For instance, the scanning can start from the last node in the DPSI partitions 12a, 12b . . . 12n and then select a highest value from the qualifying group to determine qualifying key columns in an descending order.

The described implementations provide a technique to limit a query to a subset of the multiple index (DPSI) partitions when possible and return rows in the order of the key columns of the index while the same range of key values can exist across multiple index partitions. This avoids the need to query an entire index. Instead, the query is optimized by, in certain instances, limiting the query to an index partition that has fewer searchable entries than an index on all rows of the table, where each index partition provides an index on a subset of table 8 rows stored in a particular partition 14a, 14b . . . 14n.

ADDITIONAL IMPLEMENTATION DETAILS

The described database management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The discussion and flowcharts in FIGS. 2–5 describe specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The described implementations implemented the database server in a server accessible to multiple database members. In alternative implementations, the operations described with respect to the database server may be performed by any database program handling database operations and database tables and indexes, including database programs that execute on computers other than servers.

FIG. 6 illustrates one implementation of a computer architecture 200 of the computing environment shown in FIG. 1a. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 2302, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

The invention claimed is:

1. A method for managing a database, comprising:
processing a request to create a partitioned index on at least one non-partitioning key column of a table in a computer readable medium;
determining table partitions in which rows of the table are stored;
generating one index partition for each determined table partition, wherein each index partition includes nodes, wherein each node in each index partition includes a key value from at least one column in a corresponding table row in the table partition associated with the index partition and a location identifier identifying the corresponding table row in the corresponding table partition;
receiving a request to add a row to the table;
determining one of a plurality of table partitions on which to store the added row;
determining one index partition associated with the determined table partition; and
adding a node to the determined index partition including a key value from the row added to the table and the location identifier for the added row.

2. The method of claim 1, wherein determining one of the plurality of table partitions comprises:
processing a partition map having a partition key column and criteria;
determining one table partition on which to store the added row based on a partition key column value in the added row and the criteria in the partition map for the partition key column; and
storing the added row in the determined table partition.

3. The method of claim 1, further comprising:
processing a query specifying search predicates on at least one column of the table;
if the query specifies search predicates on at least one key column of the index partitions, then querying at least one index partition for index nodes having key values that satisfy the search predicates; and
returning rows from the table corresponding to the located index nodes whose key values satisfy the search predicates.

4. The method of claim 3, wherein querying the at least one index partition and returning rows from the table further comprises:
if rows that satisfy the query search predicates are located in multiple index partitions, then scanning each index partition to determine index nodes having qualifying key values, wherein a same range of key values can exist in multiple index partitions;
selecting one qualifying key value from the determined qualifying key values according to a criteria;
returning data from the table row addressed by the location identifier in the index node including the selected qualifying key value; and
scanning the index partition comprising the selected qualifying key value to determine one node having a qualifying key value to consider with any previously determined qualifying key values not selected.

5. The method of claim 4, wherein the steps of: (i) selecting one qualifying key value, (ii) returning the corresponding table row, and (iii) scanning the index partition including the node having the selected key value to determine a next node having a qualifying key value to consider with any determined qualifying key values that were not selected in previous iterations are repeatedly performed until all nodes are considered in the multiple index partitions.

6. The method of claim 1, further comprising:
providing a partition map having at least one partition key column on the table;
processing a query specifying search predicates on at least one column of the table;
if the query specifies search predicates on at least one key column of the index partitions and at least one partition key column indicated in the partition map, then determining from the criteria indicated in the partition map at least one table partition that would have partition map key columns that satisfy the query search predicates;
determining one index partition for each determined table partition;
querying the at least one determined index partition for nodes whose key value satisfies the search predicates; and
returning rows from the table corresponding to the index nodes that satisfy the search predicates.

7. The method of claim 6, wherein the partition map associates different key column values with different table partitions, wherein determining the at least one table partition comprises determining at least one table partition associated with key column values in the criteria that are capable of satisfying the query search predicates.

8. The method of claim 1, further comprising:
processing a query specifying search predicates on at least one column of the table;
if the query specifies search predicates on at least one key column of the index partitions, then determining at least one table partition capable of having rows that satisfy the search predicates;
determining one index partition for each determined table partition;
querying the at least one determined index partition for nodes whose key values satisfy the search predicates; and
returning data from table rows addressed by the location identifiers in the index nodes having key values that satisfy the search predicates.

9. The method of claim 1, further comprising:
processing an operation with respect to at least one row in the table; and
processing one index partition associated with each table partition including the at least one table row subject to the operation when processing the operation.

10. A method for managing a database, comprising:
processing a query on an index to access rows from a table that satisfy search predicates on at least one index key column corresponding to one column in the table;
determining at least one table partition capable of including table rows that satisfy the search predicates;

determining one index partition corresponding to each determined table partition, wherein each index partition provides an index on a subset of table rows from one corresponding table partition, wherein each node in the index partition includes a key value and location identifier for a corresponding table row in the corresponding table partition;

querying each determined index partition for index nodes whose key values satisfy the search predicates; and returning data from the table rows addressed by the location identifiers in the index nodes whose key values satisfy the search predicates.

11. The method of claim 10, wherein the table rows are returned according to a sort criteria applied to all index nodes in the determined index partitions that satisfy the search predicates.

12. The method of claim 11, wherein the sort criteria applied to the determined index partitions, comprises:

scanning each determined index partition to determine one index node having a qualifying key value;

selecting one qualifying key value from the qualifying key values selected from each of the multiple index partitions according to a criteria and sorted;

returning the table row addressed by the location identifier in the index node including the selected qualifying key value; and scanning the index partition including the selected qualifying key value to determine one further qualifying key value to consider with any previously determined qualifying key values not selected.

13. A system for managing a database, comprising:

a computer readable medium;

table partitions in the computer readable medium in which rows of a table are stored;

means for processing a request to create a partitioned index on at least one non-partitioning key column of the table;

means for determining the table partitions in which rows of the table are stored;

means for generating one index partition for each determined table partition, wherein each index partition includes nodes, wherein each node in each index partition includes a key value from at least one column in a corresponding table row in the table partition associated with the index partition and a location identifier identifying the corresponding table row in the corresponding table partition;

means for receiving a request to add a row to the table;

means for determining one of the table partitions on which to store the added row;

means for determining one index partition associated with the determined table partition; and means for adding a node to the determined index partition including a key value from the row added to the table and the location identifier for the added row.

14. The system of claim 13, further comprising:

means for processing a query specifying search predicates on at least one column of the table;

means for querying at least one index partition for index nodes having key values that satisfy the search predicates if the query specifies search predicates on at least one key column of the index partitions; and means for returning rows from the table corresponding to the located index nodes whose key values satisfy the search predicates.

15. The system of claim 13, further comprising:

a partition map in the computer readable medium having a partition key column on a table;

means for processing a query specifying search predicates on at least one column of the table;

means for determining from the criteria indicated in the partition map at least one table partition that would have partition map key columns that satisfy the query search predicates if the query specifies search predicates on at least one key column of the index partitions and at least one partition key column indicated in the partition map;

means for determining one index partition for each determined table partition;

means for querying the at least one determined index partition for nodes whose key value satisfies the search predicates;

means for selecting one qualifying key value from the qualifying key values selected from each of the multiple index partitions according to a criteria and sorted;

means for returning a row from the table corresponding to the index node having the selected qualifying key value.

16. A system for managing a database, comprising:

a computer readable medium;

table partitions in the computer readable medium in which rows of a table are stored;

means for processing a query on an index to access rows from the table that satisfy search predicates on at least one index key column corresponding to one column in the table;

means for determining at least one table partition capable of including table rows that satisfy the search predicates;

means for determining one index partition corresponding to each determined table partition, wherein each index partition provides an index on a subset of table rows from one corresponding table partition, wherein each node in the index partition includes a key value and location identifier for a corresponding table row in the corresponding table partition;

means for querying each determined index partition for index nodes whose key values satisfy the search predicates; and means for returning data from the table rows addressed by the location identifiers in the index nodes whose key values satisfy the search predicates.

17. The system of claim 16, wherein the table rows are returned according to a sort criteria applied to all index nodes in the determined index partitions that satisfy the search predicates.

18. The method of claim 16, further comprising:

selecting one qualifying key value from the qualifying key values selected from each of the multiple index partitions according to a criteria and sorted, wherein the returned data comprises the table row addressed by the location identifier in the index node having the selected key value.

19. An article of manufacture for managing a database, wherein the article of manufacture causes operations to be performed, the operations comprising:

processing a request to create a partitioned index on at least one non-partitioning key column of a table in a computer readable medium;

determining table partitions in which rows of the table are stored; and generating one index partition for each determined table partition, wherein each index partition includes nodes, wherein each node in each index partition includes a key value from at least one column in a corresponding table row in the table partition associated with the index partition and a location identifier identifying the corresponding table row in the corresponding table partition;

receiving a request to add a row to the table;

determining one of a plurality of table partitions on which to store the added row;

determining one index partition associated with the determined table partition; and adding a node to the determined index partition including a key value from the row added to the table and the location identifier for the added row.

20. The article of manufacture of claim 19, wherein determining one of the plurality of table partitions comprises:

processing a partition map having a partition key column and criteria;

determining one table partition on which to store the added row based on a partition key column value in the added row and the criteria in the partition map for the partition key column; and storing the added row in the determined table partition.

21. The article of manufacture of claim 19, wherein the operations further comprise:

processing a query specifying search predicates on at least one column of the table;

if the query specifies search predicates on at least one key column of the index partitions, then querying at least one index partition for index nodes having key values that satisfy the search predicates;

selecting one qualifying key value from the qualifying key values selected from each of the multiple index partitions according to a criteria and sorted; and returning rows from the table corresponding to the located index node having the selected qualifying key value.

22. The article of manufacture of claim 21, wherein querying the at least one index partition and returning rows from the table further comprises:

if rows that satisfy the query search predicates are located in multiple index partitions, then scanning each index partition to determine index nodes having qualifying key values, wherein a same range of key values can exist in multiple index partitions;

selecting one qualifying key value from the qualifying key values selected from each of the multiple index partitions according to a criteria and sorted;

returning data from the table row addressed by the location identifier in the index node including the selected qualifying key value; and scanning the index partition comprising the selected qualifying key value to determine one node having a qualifying key value to consider with any previously determined qualifying key values not selected.

23. The article of manufacture of claim 22, wherein the steps of: (i) selecting one qualifying key value, (ii) returning the corresponding table row, and (iii) scanning the index partition including the node having the selected key value to determine a next node having a qualifying key value to consider with any determined qualifying key values that were not selected in previous iterations are repeatedly performed until all nodes are considered in the multiple index partitions.

24. The article of manufacture of claim 19, wherein the operations further comprise:

providing a partition map having at least one partition key column on the table;

processing a query specifying search predicates on at least one column of the table;

if the query specifies search predicates on at least one key column of the index partitions and at least one partition key column indicated in the partition map, then determining from the criteria indicated in the partition map at least one table partition that would have partition map key columns that satisfy the query search predicates;

determining one index partition for each determined table partition;

querying the at least one determined index partition for nodes whose key value satisfies the search predicates;

selecting one qualifying key value from the qualifying key values selected from each of the multiple index partitions according to a criteria and sorted; and returning the row from the table corresponding to the index node having the selected qualifying key value.

25. The article of manufacture of claim 24, wherein the partition map associates different key column values with different table partitions, wherein determining from the criteria the at least one table partition comprises determining at least one table partition associated with key column values that are capable of satisfying the query search predicates.

26. The article of manufacture of claim 19, wherein the operations further comprise:

processing a query specifying search predicates on at least one column of the table;

if the query specifies search predicates on at least one key column of the index partitions, then determining at least one table partition capable of having rows that satisfy the search predicates;

determining one index partition for each determined table partition;

querying the at least one determined index partition for nodes whose key values satisfy the search predicates;

selecting one qualifying key value from the qualifying key values selected from each of the multiple index partitions according to a criteria and sorted; and returning data from table row addressed by the location identifier in the index node having the selected qualifying key value.

27. The article of manufacture of claim 19, wherein the operations further comprise:

processing an operation with respect to at least one row in the table; and processing one index partition associated with each table partition including the at least one table row subject to the operation when processing the operation.

28. An article of manufacture for managing a database, wherein the article of manufacture causes operations to be performed, the operations comprising:

processing a query on an index to access rows from a table that satisfy search predicates on at least one index key column corresponding to one column in the table;

determining at least one table partition capable of including table rows that satisfy the search predicates;

determining one index partition corresponding to each determined table partition, wherein each index partition provides an index on a subset of table rows from one corresponding table partition, wherein each node in the index partition includes a key value and location identifier for a corresponding table row in the corresponding table partition;

querying each determined index partition for index nodes whose key values satisfy the search predicates; and returning data from the table rows addressed by the location identifiers in the index nodes whose key values satisfy the search predicates.

29. The article of manufacture of claim 28, wherein the table rows are returned according to a sort criteria applied to all index nodes in the determined index partitions that satisfy the search predicates.

30. The article of manufacture of claim 29, wherein the sort criteria applied to the determined index partitions, comprises:

scanning each determined index partition to determine one index node having a qualifying key value;

selecting one qualifying key value from the determined qualifying key values according to a criteria;

returning the table row addressed by the location identifier in the index node including the selected qualifying key value; and scanning the index partition including the selected qualifying key value to determine one further qualifying key value to consider with any previously determined qualifying key values not selected.

31. The article of manufacture of claim 28, further comprising:

selecting one qualifying key value from the qualifying key values selected from each of the multiple index partitions according to a criteria and sorted, wherein the returned data comprises the table row addressed by the location identifier in the index node having the selected key value.

* * * * *